United States Patent [19]

Sieverding

[11] Patent Number: 4,835,203

[45] Date of Patent: May 30, 1989

[54] POLYCAPROLACTONE MODELING AND MOLDING COMPOSITIONS

[76] Inventor: David L. Sieverding, 7260 Mount Sherman Rd., Longmont, Colo. 80501

[21] Appl. No.: 61,963

[22] Filed: Jun. 15, 1987

[51] Int. Cl.$^4$ .................... C08K 5/20; C08L 67/04
[52] U.S. Cl. ..................... 524/227; 524/217; 524/226; 524/230; 524/233; 524/394; 524/397; 524/399; 524/400; 524/599
[58] Field of Search ............... 524/599, 217, 227, 230, 524/226, 233, 397, 399, 400, 394

[56] References Cited

U.S. PATENT DOCUMENTS

| | | | |
|---|---|---|---|
| 3,140,268 | 7/1964 | Halpern | 524/230 |
| 3,533,994 | 10/1970 | Stewart | 524/230 |
| 3,883,456 | 5/1975 | Finck | 524/230 |
| 3,964,915 | 6/1976 | Doenges | 524/230 |
| 4,546,126 | 10/1985 | Breitenfellner | 524/394 |
| 4,595,713 | 6/1986 | St. John | 528/354 |
| 4,663,375 | 5/1987 | Tamura | 524/228 |

FOREIGN PATENT DOCUMENTS

| | | | |
|---|---|---|---|
| 61-42679 | 3/1986 | Japan | 528/354 |
| 62-54736 | 3/1987 | Japan | 524/230 |
| 6606665 | 11/1967 | Netherlands | 524/599 |

Primary Examiner—C. Warren Ivy
Attorney, Agent, or Firm—George A. Skoler

[57] ABSTRACT

The invention involves modeling and molding extruded compositions comprising previous extruded polycaprolactone extrusion blended with a small amount of a detackifier comprising a fatty acid salt or amide.

10 Claims, No Drawings

POLYCAPROLACTONE MODELING AND MOLDING COMPOSITIONS

This application is related to copending application Ser. No. 61,962, commonly assigned and filed on even date herewith.

BRIEF SUMMARY OF THE INVENTION

The invention relates to a modeling and molding extruded composition comprising polycarolactone extrusion blended with a small amount of a fatty acid salt or amide.

DETAILED DESCRIPTION OF THE INVENTION

Discussion of the Prior Art

Hobbyists have had available to them modeling materials which are softened in hot water, can be shaped when softened and upon cooling, solidifies to a stiff material that retains the shape. One such material is high molecular weight poly($\epsilon$-caprolactone). It has been determined to develop certain deficiencies for this application when it is repeatedly worked in the melt.

Poly($\epsilon$-caprolactones)[1] is a polymer formed by the addition reaction of $\epsilon$-caprolactone with a starter alcohol. See *J. V. Koleske,* Chapter 22 of Paul & Neuman, Polymer Blends, vol. 2, Pages 369–389, published by Academic Press, Inc., 1978. It is generally available from Union Carbide Corporation, Danbury, CT 06817, in 3 molecular weight grades: PCL-700, a tough, extensible polymer with a molecular weight ($\overline{M}_w$) of about 40,000; PCL-300 with a molecular weight ($\overline{M}_n$) of about 10,000; and PCL-150 with a molecular weight ($\overline{M}_n$) of about 5,000. According to Koleske, at page 370, "Low molecular weight ($\overline{M}_n \sim 300\text{–}3000$) oligomers or polyols are also commercially available. However, these polyols have utility as intermediates for polyurethanes and are not used as blending materials."

[1]This term is hereinafter called "polycaprolactones" or "polycaprolactone" as the case may be.

The polycaprolactones with which this invention is concerned are those having a high molecular weight ($\overline{M}_w$) corresponding to a reduced viscosity at a concentration of 0.2 gm/dl of benzene, determined at 30° C., of between about 0.5 and 10, preferably between about 1.5 and 5. In the most preferred embodiment, the high molecular weight polycaprolactone has a reduced viscosity of between about 3.0 and 4.0. These high molecular weight polycaprolactones are thermoformable plastic materials which exhibit crystallinity on cooling from the melt. They have a crystalline melting temperature ($T_m$) of about 60° C.

PCL-700 is chemically characterized by the following formula:

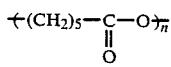

wherein n has a value between about 100 and 3000. Relevant physical properties of PCL-700 are as follows:

| | |
|---|---|
| 1% Secant Modulus, psi. | 50,000 |
| Yield Stress, psi. | 1,600 |
| Tensile Strength, psi. | 3–4,000 |
| (based on initial cross sectional area) | |
| % Elongation | 500 to 1,000 |
| Melting Point, °C. ($T_m$) | 60 |
| Glass Transition Temperature, °C. ($T_g$) | −60 |
| Density, g./cc. | |
| at 0° C. | 1.160 |
| at 20° C. | 1.149 |
| at 40° C. | 1.134 |
| Moisture Content, % | |
| at 50% Relative Humidity | 0.07 |
| at 100% Relative Humidity | 0.43 |
| Melt Flow, g./10 minutes[2] | |
| 80° C. | 1.9 |
| 100° C. | 3.7 |
| 120° C. | 6.5 |
| 150° C. | 13.4 |
| 170° C. | 20.2 |
| 190° C. | 30.6 |

[2]ASTM Method D 1238 at 43.25 psi., using PCL-700 dried at 40° C. under vacuum for 16 hours.

Because of its crystalline nature on cooling from the melt, high molecular weight polycaprolactone tends to shrink. In a molding application, this means that high molecular weight polycaprolactone will easily separate itself from the mold wall. Thus high molecular weight polycaprolactone as such, does not require a release agent to be formulated with it for molding applications. Polymers which contain caprolactone units are not necessarily the equivalent of high molecular weight polycaprolactone in this regard. For example, a polyurethane in which a low molecular weight polycaprolactone is used as a diol starter has substantially different physical and chemical properties from a high molecular weight polycaprolactone. Many of such polyurethanes are thermosets or elastomers. Reference is made to Forrester et al., U.S. Pat. No. 3,382,202.

High molecular weight polycaprolactone is typically fed from the polymerization reactor in the melt condition to the extruder from which it is pelletized by melt extrusion in spaghetti-like fashion through a multi-orifice die and chopped to the desired pellet length. Consequently, the material is subjected to the minimum thermal degradation.

I have determined that when high molecular weight polycaprolactone is remelted and reworked in the melt, such as by mixing, and then extruded, a slight degradation of the polymer occurs. This degradation is not perceptable until the polymer is again melted and worked by hand. When subjected to such conditions, the melted polymer exhibits an annoying tackiness to the skin. If one desires to shape the melted polymer by hand as one would in a hobbyist application, this annoying property makes the shaping action difficult and leaves a deposit of the polymer on the hands necessitating a special clean up step in the shaping. This annoying attribute of high molecular weight polycaprolactone was not appreciated prior to this invention. Indeed, the prior art teaches that high molecular weight polycaprolactone exhibits "little if any tackiness" when used in a molded cast application, see U.S. Pat. No. 3,692,023, patented Sept. 19, 1972, especially at column 4, lines 41–48.[3]

[3]"When more than about 20 percent cyclic ester polymer is used, there is little if any tackiness and objects made from suvch blends do not adhere to themselves at ambient temperatures even when pressed together at such temperatures over extended periods, although they will adhere to themselves when pressed together at elevated temperatures."

I have determined that when high molecular weight polycaprolactone is properly blended with a select class of chemicals, the residual tackiness existing after multiple extrusions and upon remelting can be essentially eliminated. This allows one to use a polymer in a wide array of hobbyist applications without necessitating a personal cleanup step.

Certain materials have been long recognized as mold release agents for select classes of plastics. A number of these materials have other uses affecting other selected plastics. For example, N,N'-dioleoylethylenediamine, a preferred material used in this invention, is characterized as an internal/external lubricant for polyvinylchloride, a mold release agent with thermoplastic urethanes, and an anti-block and slip agent in printing ink vehicles (permits overprinting without loss of adhesion). The recommendation of such materials as a molding lubricant for a plastic that has not required a mold release agent is not a common industrial practice. There is no suggestion in the art that such materials can act as a skin detackifier for a plastic which is described by the art as having little if any tackiness.

SUMMARY OF THE INVENTION

The invention is directed to a blend of a previously extruded high molecular weight polycaprolactone extrusion blended to contain a detackifying amount of a fatty acid salt or amide. More particularly, the invention relates to a modeling and molding composition comprising a previously extruded polycaprolactone extrusion blended with a small amount of a fatty acid salt or amide.

DETAILS OF THE INVENTION

The invention is concerned with blending into a high molecular weight polycaprolactone a sufficient amount of a "skin detackifier" such that the polymer can be remelted and handled by hand in the melt condition without sticking to hands. I have found that amongst the class of materials used as mold release agents in the conventional class of molding resins, there are materials that can be used in accordance with the invention as a skin detackifier. It is not alleged that these materials are required as mold release agents for the use of high molecular weight polycaprolactones. The desired application for the blend of the invention is as a hobbyist modeling material. Its primary application is as a hand shapable material where pellets, strips, bars etc. of the blend are softened either in water or in air, and while softened, shaped according to the hobbyist's desire. In some activities, the blend material will be reheated a number of time in the forming process. Thus the function of the skin detackifier is to effect clean separation of skin from the blend, not a separation of a metal mold surface from the molded plastic.

The skin detackifiers useful in the practice of the invention are the class of salts and amides encompassed by the following formula:

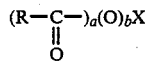   I wherein each R, taken separately, is an alkyl or alkenyl group containing 8 to 20 carbon atoms, a has a value equal to the ionic or covalent bond free valence of X, and typically is 1 to about 4, b is 0 when I an amide, and is equal to a when I is a salt, X is an inorganic or organic moiety selected from the group of (a) alkali and alkaline earth metals (e.g., Li, Na, K, Rb, Cs, Be, Mg, Ca, Sr, and Ba)

(b) zinc (c) $NR°_{4-a}$ (d) $NR°_{3-a}$ (e) polyamines of the formula

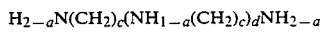

wherein a is as defined above, except that when b is equal to a, a in moieties (c), (d) and (e) is equal to 0 to achieve a salt structure and collectively satisfies the number of carboxyl groups associated with the polyamine, c is equal to 2 to 6 inclusive, and R° is alkyl of 1 to 4 carbon atoms, or aryl of 6 to 8 carbon atoms (when the aryl has more than 6 carbon atoms, the added carbon atoms are in the form of alkyl, either methyl or ethyl, to form an alkaryl group).

Thus, the salt may be the aforementioned metal salts, an ammonium salt and amides. The amides are formed by the reaction of the fatty acid or fatty acid halide with a monoamine of the formula $NR°_3$ or a polyamine of the formula $H_2N(CH_2)_c(NH(CH_2)_c)_dNH_2$. The fatty acid or fatty acid halide may be of the formula R—C(O)OH or R—C(O)Y, wherein Y may be a halogen such as chlorine, fluorine, iodine or bromine. Desirable fatty acids include the fatty acids derived from vegetable and marine oils such as saturated fatty acids, e.g., capric, lauric, myristic, palmitic, stearic, arachidic and behenic acids, and unsaturated fatty acids, e.g., oleic, linoleic, linolenic, eleostearic, licanic and ricinoleic acids.

The preferred detackifier in the blends of the invention are the mono and polyamides of the fatty acids and the aforementioned mono and polyamines. The more preferred detackifier is an amide compound in which there are from 1 to 3 carboxamide moieties and an alkyl or alkylene group attached to an amido nitrogen containing at least 4 carbon atoms. Illustrative of such amides are the following:

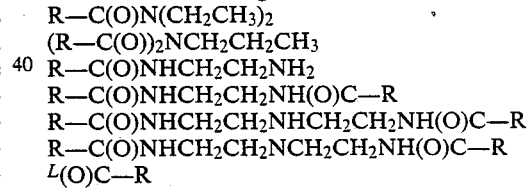

The most desirable of these are the amides wherein R is alkenyl, that is, those amides where the fatty acid is an unsaturated fatty acid such as oleic acid and recinoleic acid or a saturated fatty acid containing 8 to about 14 carbon atoms. The most preferred amides for detackifiers are those made from alkylene polyamines where the alkylene contains from 2 to 4 carbon atoms, preferably ethylene, and the fatty acid is oleic acid. The especially preferred amide is N,N'-bis(oleoyl)ethylenediamine.

The amount of the detackifier used in the practice of the invention may range from about 0.25 to about 5 weight % of the weight of the blend of the high molecular weight polycaprolactone and the detackifier. A certain amount of subjectiveness is involved in selecting the amount of detackifier to combine with the high molecular weight polycaprolactone. Because of the added cost associated with the addition of the detackifier, it is preferred to employ the minimum amount needed to effect the desired amount of detackification of the high molecular weight polycaprolactone during use and retain the polycaprolactone's excellent paintability, especially in repeated use involving repeated melting and reworking of the high molecular weight polycaprolactone. I have found that about 0.5 to about 2.5 weight %, same basis, of the detackifier will generally provide the desired results. I have selected about 1 weight %, same basis, of the detackifier in my preferred formulations.

The preferred invention involves the selection of a detackifier, used in small amounts, that imparts the desired detackification to the polycaprolactone yet retains for the polycaprolactone the desired heat shaping and painting capabilities for hobbyist applications.

Blending of the detackifier and the high molecular weight polycaprolactone is effected during extrusion of the high molecular weight polycaprolactone. This is accomplished by adding the desired amount of the detackifier to the extruder in the course of the extrusion or premixing the two in a simple blending operation prior to extrusion and then submitting the simple blend to the extrusion step. The extrusion may be carried out in the conventional manner. Because of the vunerability of the high molecular weight polycaprolactone to degrade on working, it is desirable to not overwork the high molecular weight polycaprolactone. Thus a simple screw type extruder is preferred to effect the blending of the high molecular weight polycaprolactone with the detackifier. I have found that a single screw extruder operated at about 150° C. is adequate for effecting the extrusion blending of the invention. Illustrative of such an extruder is a 2.5 inches (6.35 cm.) single screw Prodex TM extruder.

A desirable formulation comprises 100 pounds (45.36 kg) of high molecular weight polycaprolactone (PCL-700 from Union Carbide Corporation) pellets, 1 pound (0.4536 kg) of N,N'-dioleoylethylenediamine, and about 0.705 av.oz. (20 grams) to about 2 pounds (0.9072 kg) of colorant (pigments) depending on the nature of the colorant. This formulation is stirred in a container until relatively homogeneous. The container's contents are incrementally fed to a 2.5 inches (6.35 cm.) single screw Prodex TM extruder operated at about 150° C. to form ribbons 1 inch (2.54 cm.)×1/16th inch (0.159 cm.) in dimension. The extruded blend can be tested by softening ribbons of the blend in a container of hot water and kneading with ones hands until there is shaped an essentially flat 3 (7.62 cm.) inches square sheet 1/32 inch (0.079 cm.) in thickness. The worked up sheet will be found to be tack free and no deposit of the high molecular weight polycaprolactone will be found on the hands.

I claim:

1. A composition suitable for modeling shaped articles comprising extruded high molecular weight polycaprolactone which is additionally extrusion blended with a small amount of detackifier comprising a fatty acid amide.

2. The composition of claim 1 wherein the fatty acid amide is an amide compound in which there are from 1 to 3 fatty acid carboxamide moieties and an alkyl or alkylene group attached to an amido nitrogen containing at least 4 carbon atoms.

3. The composition of claim 2 wherein the fatty acid amide is one of
$R-C(O)N(CH_2CH_3)_2$
$(R-C(O))_2NCH_2CH_2CH_3$
$R-C(O)NHCH_2CH_2NH_2$
$R-C(O)NHCH_2CH_2NH(O)C-R$
$R-C(O)NHCH_2CH_2NHCH_2CH_2NH(O)C-R$
$R-C(O)NHCH_2CH_2NCH_2CH_2NH(O)C-R$
$L(O)C-R$.

4. The composition of claim 3 wherein the fatty acid amide is N,N'-bis(oleoyl)ethylenediamine.

5. The composition of claim 4 wherein the fatty acid amide is present in the amount of from about 0.25 to about 5 weight % of the weight of the blend of the high molecular weight polycaprolactone and the detackifier.

6. The composition of claim 5 wherein the amount of the fatty acid amide is about 0.5 to about 2.5 weight %.

7. The composition of claim 6 wherein the amount of the fatty acid amide is about 1 weight %.

8. The composition of claim 1 wherein the high molecular weight polycaprolactone has a molecular weight corresponding to a reduced viscosity at a concentration of 0.2 gm/dl of benzene, determined at 30° C., of between about 0.5 and 10.

9. The composition of claim 8 wherein the high molecular weight polycaprolactone has a reduced viscosity of between about 1.5 and about 5.

10. The composition of claim 9 wherein the reduced viscosity is between about 3 and about 4.

* * * * *